United States Patent [19]
Aston

[11] 3,899,737
[45] Aug. 12, 1975

[54] APPARATUS FOR TESTING ALTERNATOR DIODES

[75] Inventor: Owen Aston, Salt Lake City, Utah

[73] Assignee: Carl R. Haueter, Salt Lake City, Utah ; a part interest

[22] Filed: Oct. 12, 1972

[21] Appl. No.: 296,802

[52] U.S. Cl............................ 324/158 D; 324/110
[51] Int. Cl..................... G01r 31/22; G01r 1/36
[58] Field of Search ........ 324/158 D, 110, 115, 127

[56] References Cited
UNITED STATES PATENTS

| 1,540,307 | 6/1925 | Beall | 324/110 |
| 2,238,298 | 4/1941 | Wehrlin | 324/127 |
| 2,362,372 | 11/1944 | Halfmann | 324/115 |
| 3,676,767 | 7/1972 | Boelter | 324/158 D |

FOREIGN PATENTS OR APPLICATIONS

| 854,824 | 9/1952 | Germany | 324/110 |

OTHER PUBLICATIONS
Levy, I. J.; "Reverse-Current . . ."; Electronics; Jan. 3, 1958; pg. 88, 90.

Primary Examiner—Alfred E. Smith
Assistant Examiner—Ernest F. Karlsen
Attorney, Agent, or Firm—K. S. Cornaby

[57] ABSTRACT

An apparatus for testing alternator diodes, such as in automobile alternators, has a plurality of coupling means for connection respectively to the diode to be tested, the alternator, and the positive and negative terminals of an electrical energy source. The apparatus also has an amperage metering circuit having means for indicating the amperage of current flowing in either direction, and a current limiting circuit having current limiting means for controlling the amount of current passing through the diode. Circuit means are provided for alternately connecting the amperage metering circuit and current limiting circuit respectively with the positive and negative electrical energy source terminals for reversing the flow of current through the test apparatus.

7 Claims, 1 Drawing Figure

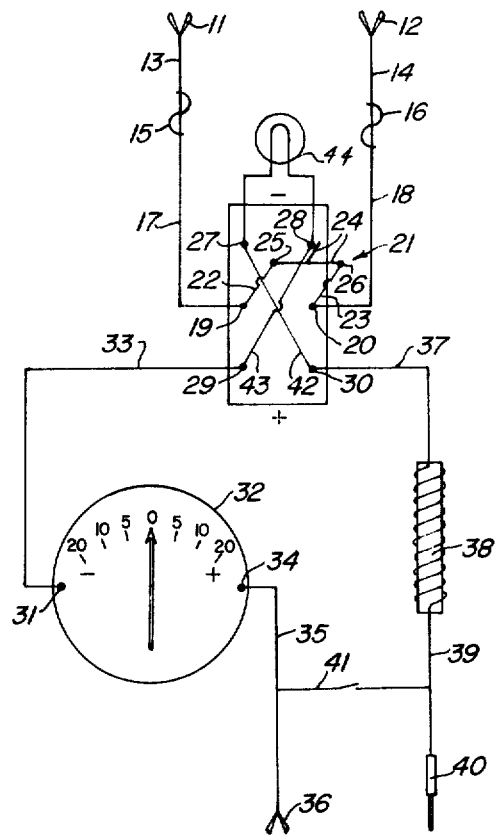

APPARATUS FOR TESTING ALTERNATOR DIODES

BACKGROUND OF THE INVENTION

1. Field:

This invention relates to apparatus for testing diodes.

2. State of the Art:

The introduction of alternators into automotive electrical systems has necessitated the development of new techniques and methods of repairing such alternators. Automotive alternators commonly contain two sets of three diodes each, each set being referred to as a negative or a positive set. Since diodes are designed to permit the flow of current therethrough in only one direction, an alternating current of electricity passing through an alternator is rectified to direct current by the two sets of diodes, each set of which reverses the current flow.

In the present practice, when a diode has shorted out, or malfunctioned in some way, it has been necessary to remove the alternator from the automobile electrical system and to remove each diode from the alternator for individual bench testing. This has resulted in loss of time in removing and replacing the individual diodes. The process has also had to be repeated two or three times if more than one diode was faulty.

Accordingly, there has been a need for a test apparatus to locate malfunctioning diodes without removing them from the alternator.

SUMMARY OF THE INVENTION

In accordance with the invention, an apparatus is provided for testing alternator diodes without removing the diodes from the alternator. The apparatus has coupling means comprising first, second, third and fourth couplings adapted for connection respectively to the negative and positive terminals of a source of electrical energy, to the alternator, and to a diode in the alternator. An amperage metering circuit is included which has means for indicating the amperage of current flowing in either direction within the circuit. The amperage metering circuit is connected in series with the third coupling. A current limiting circuit having current limiting means therein is connected thereto. A circuit switching means is also provided for alternately connecting the amperage metering circuit and the current limiting circuit respectively with the first coupling and with the second coupling to reverse the flow of current through the circuit.

THE DRAWING

The best mode presently contemplated of carrying out the invention is illustrated in the accompanying drawing, in which the single FIGURE shows a schematic electrical circuit diagram of the apparatus.

DETAILED DESCRIPTION OF THE ILLUSTRATED EMBODIMENT

As illustrated in the single FIGURE of the accompanying drawing, a preferred embodiment of the invention has two couplings 11 and 12 for connection to the respective negative and positive terminals of an electrical energy source, such as an automotive 12-volt battery (not shown). For ease of connection, it is preferred that couplings 11 and 12 be provided with alligator clips, but other connecting means can be employed if desired.

Couplings 11 and 12 are connected respectively through leads 13 and 14 to respective fuses 15 and 16 adapted to control the flow of current from the electrical source through the test apparatus. In a preferred embodiment, the apparatus operates with a maximum of 20 amps current, so that fuses 15 and 16 are preferably 20 amp fuses. Current flow exceeding 20 amps causes the fuses to blow, and damage to the apparatus is thereby prevented.

Leads 17 and 18 respectively extend from fuses 15 and 16 to respective contacts 19 and 20 of a double-throw double-pole switch 21. Switch 21 has a pair of moveable leads 22 and 23 controlled by handle 24 extending respectively from contacts 19 and 20 to respective moveable contacts 25 and 26. Moveable contacts 25, 26 come into contact respectively with contacts 27, 28 when switch 21 is in the upper, or negative, position. Contacts 25, 26 conversely come into respective contact with another pair of contacts 29, 30 when switch 21 is in the lower, or positive position.

Contact 29 is connected to terminal 31 of an ammeter 32 through a lead 33. Ammeter 32 is preferably a double meter positive and negative flow ammeter capable of measuring the flow of current in either direction. The other terminal 34 of ammeter 32 is connected through lead 35 to a third coupling 36, which in this instance preferably has an allagator clip for use of attachment to an alternator (not shown) containing the diodes to be tested.

In the other half of the circuit, contact 30 is connected through lead 37 to a current limiting coil 38 which functions with fuses 15 and 16 to limit the amount of current flowing through the circuitry within the test apparatus. It has been found advantageous to provide a 15 amp coil in this embodiment to maintain the flow at about 15 amps. Coil 38 is connected through lead 39 to a fourth coupling 40 which is adapted to be placed in contact with the diodes to be tested. Coupling 40 preferably has a test probe for use in touching the diode terminal for testing. A single pole switch 41, normally open, is attached between leads 35 and 39 to close the circuit for testing the internal components of the test apparatus without attachment of couplings 35 and 40 respectively to the alternator and diodes.

Within double pole switch 21, leads 27 and 30 are connected through internal lead 42, and leads 28 and 29 are connected through lead 43. Accordingly, when switch 21 is in the downward or positive position, current flows through contact 20, lead 23, contact 26, contact 30 and leads 37 and 39 to coupling 40. The return flow of current travels through coupling 36 and ammeter 32 to contact 29, and from there through lead 22 to contact 19 and the negative coupling 11.

When switch 21 is in the upward or negative position, current flows from contact 2 through lead 23 to contact 28, and from there through internal lead 43 to contact 29 and through the reverse flow of the positive position. The return flow of current travels from coupling 40 through leads 39, 37 to contact 30, and from there through leads 42 and 22 to the negative coupling 11.

Whenever the apparatus is connected to an electrical source, a pilot light 44 connected to contacts 27 and 28 of switch 21 is illuminated. When switch 21 is in the positive position, the positive diodes in an alternator can be tested.

Conversely, when the switch is in the negative position, the negative diodes can be tested. For testing positive diodes, it is preferred to connect coupling 36 to the alternator positive output post. For negative diode testing coupling 36 can be connected to the alternator housing or to the ground post.

As an alternative to the use of a standard 12-volt automotive battery, a battery eliminator can be employed, wherein a transformer housing a 30-volt output can have a center pole tap to generate 15 volts.

As an example of its use, the test apparatus was employed to test faulty diodes and to detect open or shorted diodes, loose diode stators, solder joints and pressure tight broken wires. The following test procedure can be followed to advantage.

TEST PROCEDURE FOR POSITIVE DIODES

Main switch is placed in positive position. Third coupling with allagator clip (black clip lead) is attached to alternator output post. Fourth coupling test probe (red test probe) is applied successively to each of the three positive diode stems. Each diode should read 15 amps on the ammeter. If one of the diodes indicates a 10 amp reading while the other diodes read 15, then the 10 amp diode is an open diode which should be removed and replaced.

To test for a shorted positive diode, the switch should be reversed to the negative position. Again, the red test lead is applied to all positive diode stems. No reading should occur on the ammeter for any diode. If a diode is shorted, two of the diodes will read 10 amps, and the shorted diode will read 15 amps. The shorted diode should be removed and replaced.

TEST PROCEDURE FOR NEGATIVE DIODES

The main switch should be in the negative position and the black clip lead is attached to the alternator case. The red test lead is applied to each of the three negative diode stems and each should read 15 amps on the ammeter. If two diodes read 15 amps and one diode reads 10 amps, the 10 amp diode is an open negative diode which should be removed and replaced. To test for a shorted negative diode, the switch is reversed to the positive position and the red test lead is applied to all negative diode stems. No reading should occur. If two diodes read 10 amps and one diode reads 15 amps, the 15 amp diode is shorted and should be removed and replaced.

The alternator stator can also be tested for grounding. The main switch of the test unit must be in the negative position and the black clip lead is attached to any one of the three stator leads. The red test lead is then applied to the stator case. No reading should occur. The rotors of the alternator can also be tested by setting the switch to either the positive or negative position. The test leads are applied to the slip rings of the rotor and an indication on the ammeter of 2½ – 4½ amps should be indicated, depending on the winding of the rotors. If no reading is detected, there is an open coil.

Care should be taken that the automotive 12-volt battery should be completely charged. Typically, such a completely charged battery will carry approximately a 13-volt charge. If the battery is discharged or the charge is so low that only a 10 amp reading is obtained, then the test unit will not perform adequately.

The test apparatus can be checked internally for malfunctioning components of the test unit by closing the single pole test switch between the black and red test leads. If 15 amps reads on the ammeter, the test leads are open. If no reading is obtainable on the ammeter, the 20 amp fuses should be checked. If the 20 amp fuses are functioning, the problem is in the test unit itself. Therefore, the unit should be checked for broken wires, faulty ammeter, or an open limiting coil.

Whereas this invention is illustrated and described herein with respect to a certain preferred form, it is to be understood that many variations are possible without departing from the inventive concepts set forth with particularity in the claims.

I claim:

1. Apparatus for testing alternator diodes, comprising in combination:

coupling means comprising first, second, third, and fourth couplings adapted for connection respectively to the negative terminal of an electrical source, the positive terminal of an electrical source, an alternator and to a diode of said alternator;

an amperage metering circuit having means for indicating amperage of current flowing in either direction in the circuit, said circuit being connected in series with the third coupling;

a current limiting circuit having current limiting choke means, said circuit being connected in series with the fourth coupling, circuit switching means having means for alternately connecting said amperage metering circuit with the first coupling and with the second coupling and for alternately connecting said current limiting circuit with said first coupling and with said second coupling and switching means disposed between said third and fourth couplings for alternatively closing and opening the circuit between said couplings.

2. Apparatus as set forth in claim 1, wherein said circuit switching means comprises a double pole toggle switch.

3. Apparatus as set forth in claim 1, wherein a fuse is connected to the first coupling.

4. Apparatus as set forth in claim 1, wherein a fuse is connected to the second coupling.

5. Apparatus as set forth in claim 1, wherein said switching means comprises a single pole toggle switch.

6. Apparatus as set forth in claim 1, wherein signaling means is disposed in said circuit means for signaling when the circuit is closed.

7. Apparatus as set forth in claim 6, wherein said signaling means comprises a light source.

* * * * *